United States Patent [19]
Yamagiwa

[11] Patent Number: 5,420,632
[45] Date of Patent: May 30, 1995

[54] VIDEO CAMERA APPARATUS HAVING AN OPTICAL ZOOM MEANS AND AN ELECTRONIC ZOOM MEANS

[75] Inventor: Masatoshi Yamagiwa, Tokyo, Japan
[73] Assignee: Sony Corporation, Tokyo, Japan
[21] Appl. No.: 183,330
[22] Filed: Jan. 19, 1994
[30] Foreign Application Priority Data Jan. 21, 1993 [JP] Japan .................................. 5-008558
Feb. 8, 1993 [JP] Japan .................................. 5-020419

[51] Int. Cl.$^6$ ......................................... H04N 5/232
[52] U.S. Cl. ..................................... 348/240; 348/358
[58] Field of Search ............... 348/240, 358, 207, 335; H04N 5/232

[56] References Cited

U.S. PATENT DOCUMENTS 4,843,475  6/1989  Imai ................................. 348/240 X

FOREIGN PATENT DOCUMENTS

449210   10/1991  European Pat. Off. .
541092    5/1993  European Pat. Off. .
579165    1/1994  European Pat. Off. .
3141327   6/1991  Japan .
4316286  11/1992  Japan .
4373270  12/1992  Japan ............................... H04N 5/232
5191703   7/1993  Japan ............................... H04N 5/232

Primary Examiner—Michael T. Razavi
Assistant Examiner—Wendy R. Greening
Attorney, Agent, or Firm—Jay H. Maioli

[57] ABSTRACT

A video camera apparatus has an optical zoom and an electronic zoom which are both smoothly operated in a ganged relation while a zoom speed is maintained. The optical zoom means and electronic zoom means are respectively controlled by microcomputers. In that case, zoom information, such as a zoom magnification, is supplied to the two microcomputers via a serial communication, or a zoom magnification of the optical zoom means is constantly supplied to the microcomputer. When the optical zoom means reaches a wide angle lens end or telephoto lens end, a zoom speed thereof is not stopped rapidly but the zoom speed thereof is progressively decreased just before the optical zoom means reaches the wide angle lens end or telephoto lens end under the control of the microcomputer. When a zooming operation is started, the electronic zoom means do not immediately reach target zoom speeds but progressively increase their zoom speeds to reach the target zoom speeds.

8 Claims, 12 Drawing Sheets

VIDEO CAMERA APPARATUS HAVING AN OPTICAL ZOOM MEANS AND AN ELECTRONIC ZOOM MEANS

BACKGROUND OF THE INVENTION

1. Field of the Invention

The present invention relates to a video camera in which a zooming can be effected by an electronic zoom means.

2. Description of the Related Art

There have heretofore been proposed video cameras having an electronic zoom means in which data representing a picked-up video signal is written in a memory and a zooming is effected by arbitrarily determining the order at which the above-mentioned memory is read out.

In such video cameras, the conventional electronic zoom enlarges or reduces a magnification in a certain constant increasing width of magnification so that the magnification can be constantly reduced or enlarged only at a constant zoom speed. When the magnification is constantly reduced or enlarged only at a constant zoom speed, there is then a problem when the conventional electronic zoom is operated in a ganged relation with an optical zoom into which a variable speed zoom, in particular, was already introduced.

More specifically, in the video camera in which the optical zoom and the electronic zoom are provided together, when the optical zoom is changed to the electronic zoom, a picture is disturbed at the connected portion between the optical zoom and the electronic zoom because the zoom speeds of the optical zoom and the electronic zoom are different. In order to avoid the aforesaid shortcomings, the conventional video cameras are arranged such that the optical zoom is changed to the electronic zoom after the speed of the optical zoom is progressively decreased to reach the same zoom speed as the electronic zoom.

According to the above conventional method, however, the zoom speed is freely changed even though a zoom lever is not operated. As a result, the user cannot help feel a sense of incompatibility and a sense of discontinuity when the optical zoom and the electronic zoom are operated in a ganged relation. Thus, the video camera user cannot remove a feeling of unnaturalness completely.

Further, there are our copending European laid-open patent publications Nos. 0475840, 0485302 and 0560549 which will be briefly described below.

European laid-open patent publication No. 0475840 describes an inner focus type lens driving apparatus in which a coil for a velocity sensor is wound around a voice coil system linear actuator coil in an overlapping fashion. European laid-open patent publication No. 0485302 describes a camera lens barrel in which a zoom lens portion of an inner focus system is a quartet zoom lens. A stepping motor is driven in a micro-step fashion having a low noise and a low vibration when a low speed zooming is effected, and driven in a high torque pulse driving fashion when a high speed zooming is effected. According to this previously-proposed application, a driving speed of the driving system can be increased, a lifetime thereof can be extended, a noise thereof can be reduced and a vibration thereof can be reduced. This lens barrel for a camera is used in a small-sized camcorder. Furthermore, European laid-open patent publication No. 0560549 describes a camcoder in which when an optical viewfinder zoom and an electronic zoom are used together, a picture frame whose size is changed in accordance with a magnification of the electronic zoom is displayed on a viewfinder so that an actual shooting range can be displayed on the viewfinder accurately.

OBJECTS AND SUMMARY OF THE INVENTION

Accordingly, it is an object of the present invention to provide an improved video camera apparatus in which the aforesaid shortcomings and disadvantages encountered with the prior art can be eliminated.

More specifically, it is an object of the present invention to provide a video camera apparatus in which a camera shake can be prevented from being produced even when a zoom speed is changed rapidly.

It is another object of the present invention to provide a video camera apparatus in which an optical zoom and an electronic zoom can be smoothly effected at any zoom speed.

It is a further object of the present invention to provide a video camera apparatus in which the user does not feel a sense of incompatibility when an optical zoom is changed to an electronic zoom and vice versa.

According to a first aspect of the present invention, there is provided a video camera which comprises a lens group for converging a light from an object, an imaging device for converting a light converged by the lens group into an electrical signal, a signal processor circuit for converting an output signal from the imaging device into a video signal, a memory circuit for storing therein an output signal from the signal processor circuit, an electronic zoom means for controlling reading from the memory circuit, and a memory table for determining on the basis of a set magnification a sequential order at which a signal is read from the memory circuit, wherein a speed of the magnification of the electronic zoom can be varied by sequentially reading data in the sequential order determined by the memory table or arbitrarily skipping the same.

In accordance with a second aspect of the present invention, there is provided a zoom apparatus for video camera which comprises a lens group for converging a light from an object, an imaging device for converting a light converged by the lens group into an electrical signal, a signal processor circuit for converting an output signal from the imaging device into a video signal, a memory circuit for storing therein an output signal from the signal processor circuit, an electronic zoom means for controlling reading from the memory circuit, and a memory table for determining on the basis of a set magnification a sequential order at which a signal is read from the memory circuit, wherein a speed of the magnification of the electronic zoom means can be varied by sequentially reading data in the sequential order determined by the memory table or arbitrarily skipping the same.

According to the present invention, a time in which a magnification of the electronic zoom reaches a target magnification can be arbitrarily set by changing an increasing width of an enlargement magnification in the electronic zoom. Therefore, a variable speed electronic zoom can be realized.

Further, according to the present invention, the optical zoom and the electronic zoom can be smoothly operated in a ganged relation while maintaining a zoom speed by compensating an optical zoom speed decreased at the telephoto lens end with the electronic zoom.

Furthermore, according to the present invention, after an image is entered once into the overlapping interval, the image can be prevented from returning to the state presented before the image enters the overlapping interval regardless of the rapid decrease of the zoom speed so that, a camera shake can be avoided inasmuch as a telephoto lens mode request key is continuously depressed.

The above and other objects, features, and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

Embodiments of the present invention will now be described with reference to the drawings.

Figure 1:
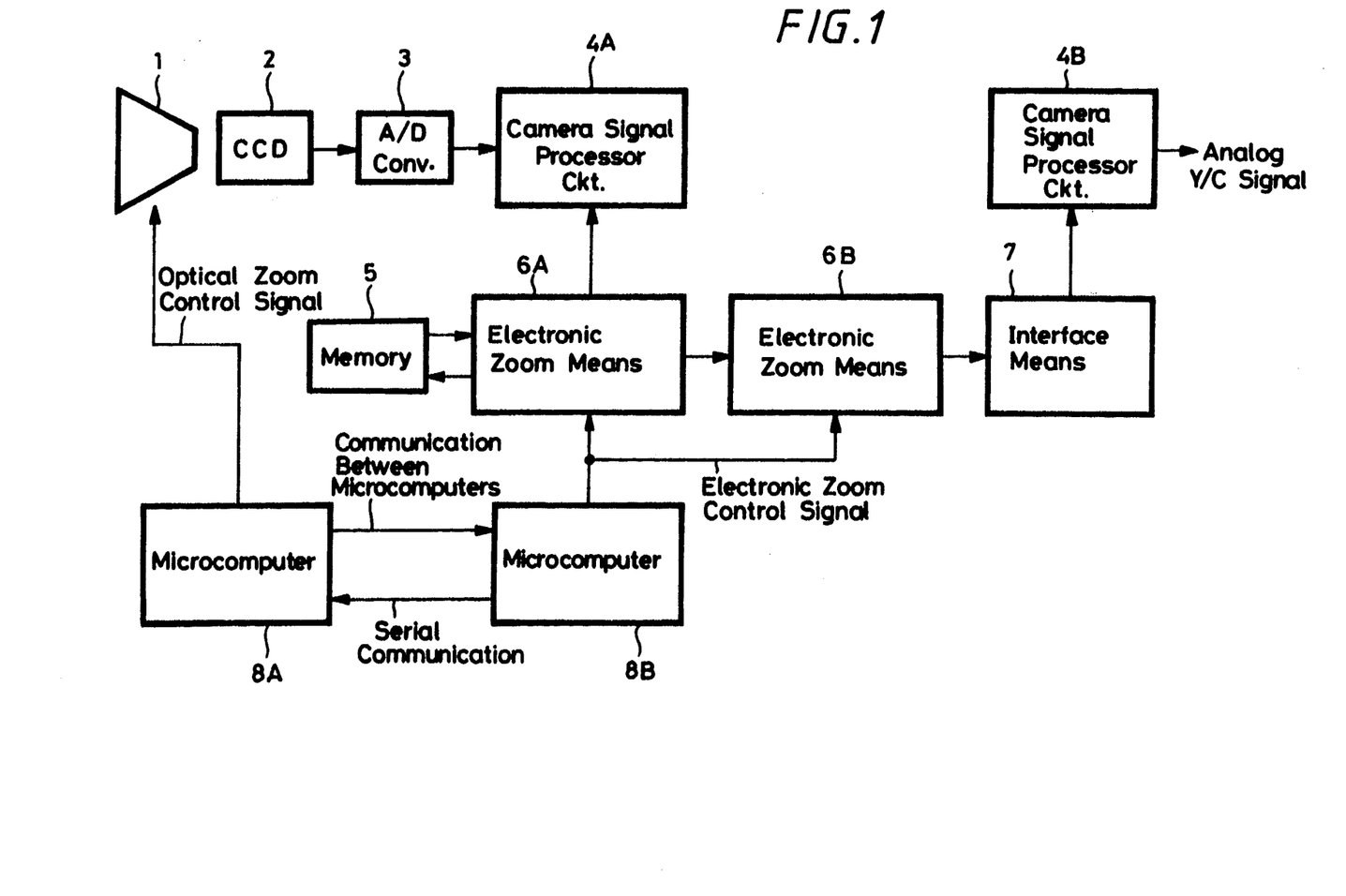
FIG. 1 is a block diagram showing a circuit arrangement of a video camera according to an embodiment of the present invention.

FIG. 1 of the accompanying drawings shows in block form a circuit arrangement of a video camera apparatus according to an embodiment of the present invention.

As shown in FIG. 1, an optical lens system that forms an optical image includes an optical zoom means 1. The optical zoom means 1 can enlarge an image at a magnification of 8 times at a maximum, and a zoom magnification thereof is controlled under an optical zoom control signal from a microcomputer 8A. An optical image formed by the optical lens system is converted into an electrical signal by a solid state imaging device 2 formed of, for example, a CCD (charge-coupled device). Image data from the CCD 2 is supplied through an A/D (analog-to-digital) converter 3 and a camera signal processor circuit 4A to an electronic zoom lens means 6A.

The electronic zoom means 6A writes the image data supplied thereto in a memory 5 and can effect the electronic zoom by interpolating the written data together with an electronic zoom means 6B. Zooming magnifications of the electronic zoom means 6A, 6B can be varied by an electronic zoom control signal from a microcomputer 8B. An output of the electronic zoom means 6B is supplied through an I/F (interface) means 7 to a camera signal processor circuit 4B which then derives an analog Y/C signal.

The optical zoom means 1 and the electronic zoom means 6A, 6B are controlled by the microcomputers 8A, 8B, respectively. In that case, zoom information such as a zoom magnification or the like is supplied to the two microcomputers 8A, 8B via a serial communication.

Action of the above-mentioned circuit arrangement will be described below.

The electronic zoom can be realized by transferring enlargement magnification data from the microcomputer 8B to the electronic zoom means 6A, 6B. More specifically, when the user wants to carry out continuous and smooth zooming, such as optical zooming, it is sufficient that magnification data having very small magnification increasing widths are sequentially transferred from the microcomputer 8B.

The microcomputer 8B includes magnification data to be transferred to the electronic zoom means 6A, 6B in the form of a table (memory table) in which magnification data are arranged in the sequential order of magnifications. This table will hereinafter be referred to as a base table. The microcomputer 8B judges on the basis of the zoom key (i.e., on the basis of a telephoto lens or wide angle lens) the order at which data are read out and then transferred.

The zoom speed of the electronic zoom is changed on the basis of the above-mentioned table. That is, if data are sequentially transferred at every line, then the electronic zoom is effected at the lowest zoom speed (base zoom speed) on this base table.

When the zooming speed is changed, if data next to the next data is continuously transmitted (i.e., data is skipped) while neglecting the data that is to be transmitted next, then the zoom speed becomes a twice zoom speed (relative to the base zoom speed). Similarly, zoom speeds of three times, four times, . . . , can be effected.

Figure 2:
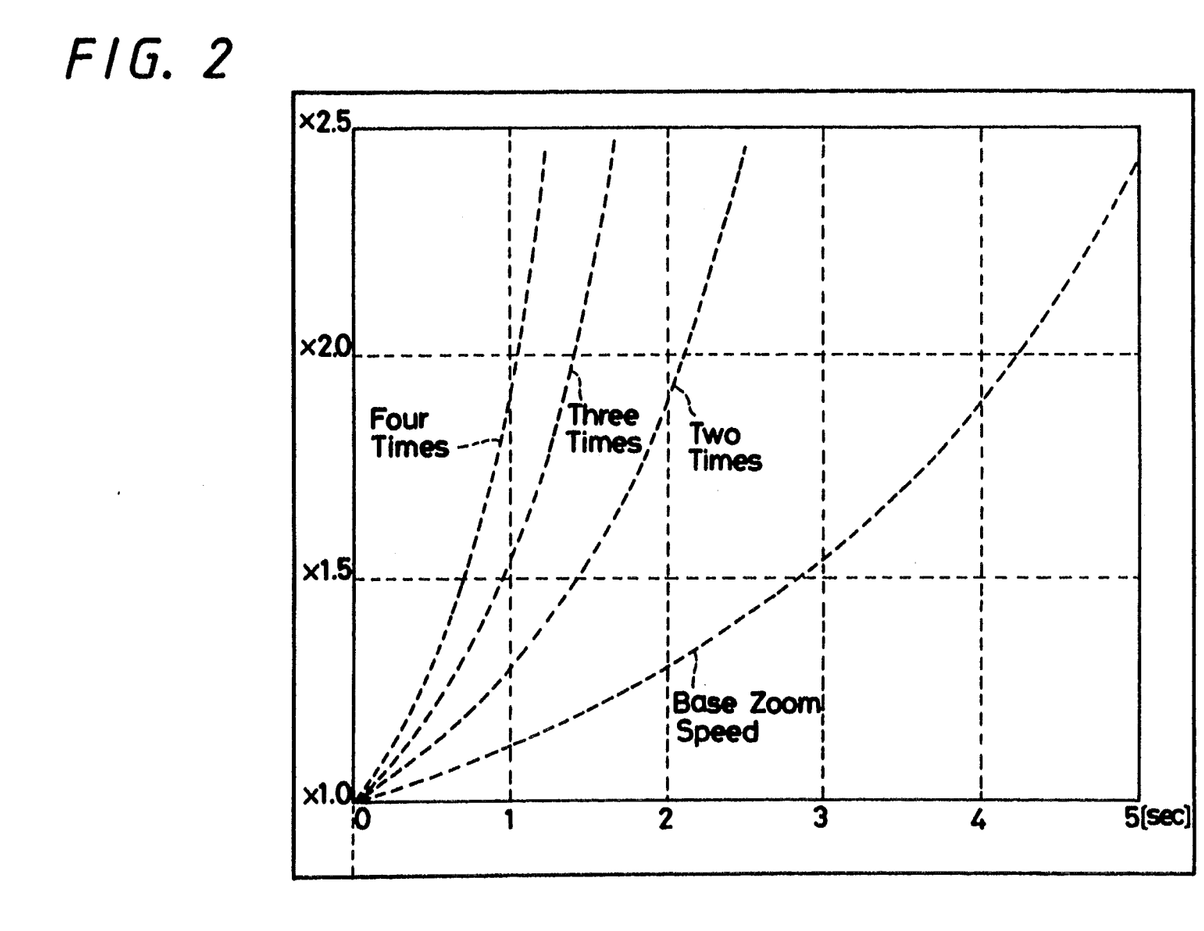
FIG. 2 is a schematic diagram showing the change of an electronic zoom in the form of a table.

FIG. 2 is a diagram showing the change of electronic zoom speed. Study of FIG. 2 reveals that the zoom speed is changed as twice, three times, . . . , on the basis of the base zoom speed. Therefore, the variable speed electronic zoom can be realized by the above-mentioned action.

As described above, according to the above-mentioned apparatus, a time required by the magnification to reach the final magnification can be set arbitrarily by changing the width in which the enlargement magnification in the electronic zoom is changed, thereby realizing the variable speed electronic zoom.

The interlocking operation between the optical zoom and the electronic zoom can be effected by using the above-mentioned variable speed electronic zoom as follows:

More specifically, in the above-mentioned apparatus, the optical zoom means 1 and the electronic zoom means 6A, 6B are respectively controlled by the microcomputers 8A, 8B. In that case, zoom information such as a zoom magnification or the like is supplied to the two microcomputers 8A, 8B via the serial communication effected therebetween. That is, the zoom magnification provided by the optical zoom means 1 is constantly supplied to the microcomputer 8B.

The zoom speed of the optical zoom means 1 is not suddenly stopped but the zoom speed is progressively decreased before reaching the wide angle lens end or telephoto lens end and then stopped at the wide angle lens end or telephoto lens end under the control of the microcomputer 8A when the optical zoom means 1 reaches the wide angle lens end or telephoto lens end. Both in the optical zoom and the electronic zoom, when the zooming is started, the target zoom speed is not reached instantly but rather the zoom speed is progressively increased until the target zoom speed is reached.

Operation of the above-mentioned arrangement will be described. In this case, the condition that the optical zoom is changed to the electronic zoom will be described below.

When the zoom magnification approaches the optical telephoto lens end by the optical zoom means 1, the zoom speed of the electronic zoom is progressively increased so as to compensate for the decreased zoom speed of the optical zoom. The microcomputer 8B determines a zoom position of the optical zoom for starting the electronic zoom.

Figure 3:
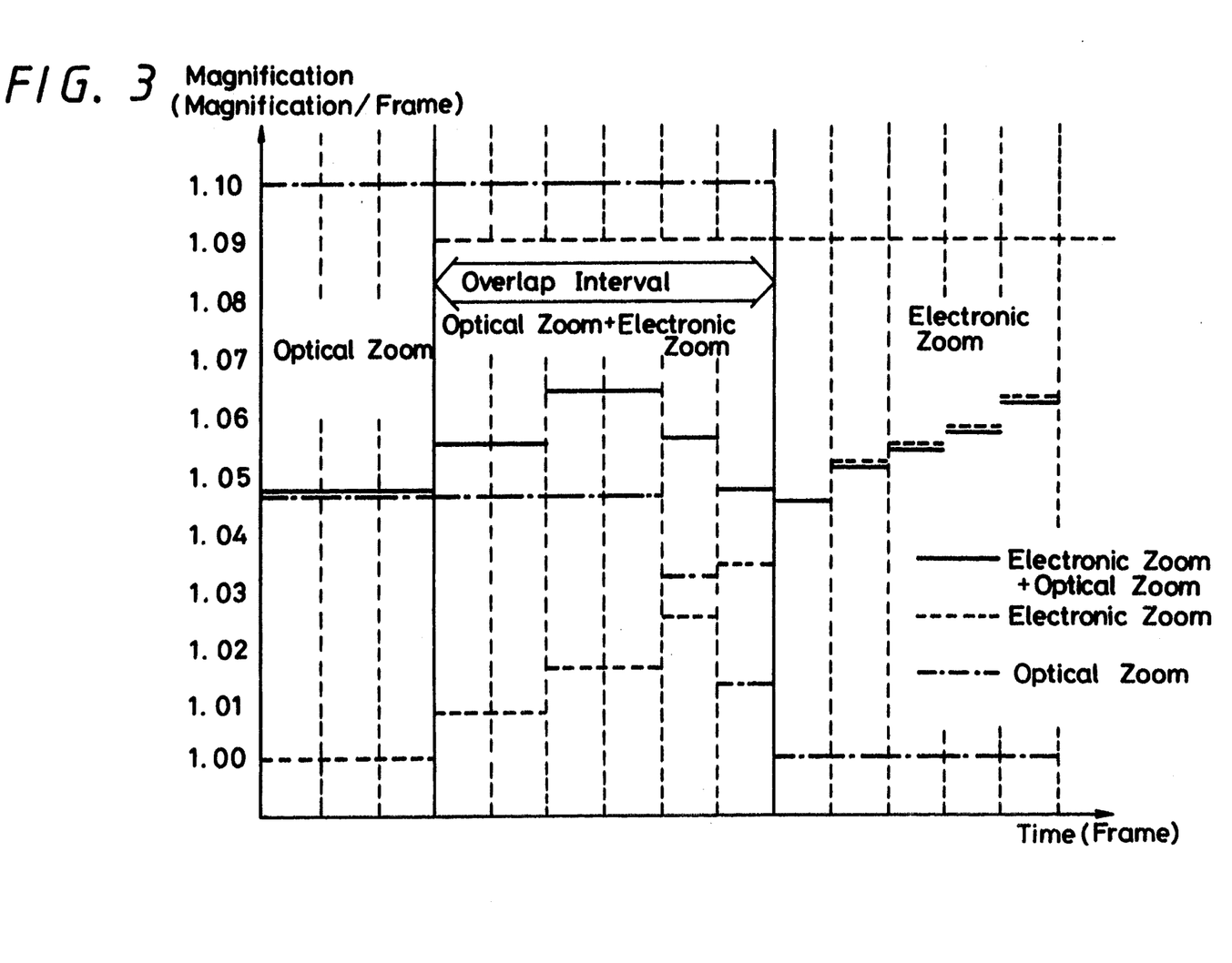
FIG. 3 is a schematic diagram showing the change of zoom speed obtained when an optical zoom and an electronic zoom are effected in an overlapping fashion.

FIG. 3 is a diagram showing an example of the change of the zoom speed when the optical zoom is changed to the electronic zoom and vice versa. In FIG. 3, the ordinate represents the magnification of the present picture relative to the picture of one frame before (i.e., so-called zoom speed), and one scale on the abscissa represents one frame. In FIG. 3, an overlapping interval represents an interval in which the optical zoom and the electronic zoom are effected in a ganged relation to each other. A study of FIG. 3 reveals that a synthesized speed of the optical zoom (shown by a one-dot chain line in FIG. 3) and the electronic zoom (shown by a broken line) is changed more or less although there is provided the interval in which the optical zoom and the electronic zoom are operated in a ganged relation. Therefore, with the above-mentioned arrangement, it cannot be expected that the smooth change of the optical zoom and the electronic zoom is not effected from a zoom speed standpoint.

Figure 4:
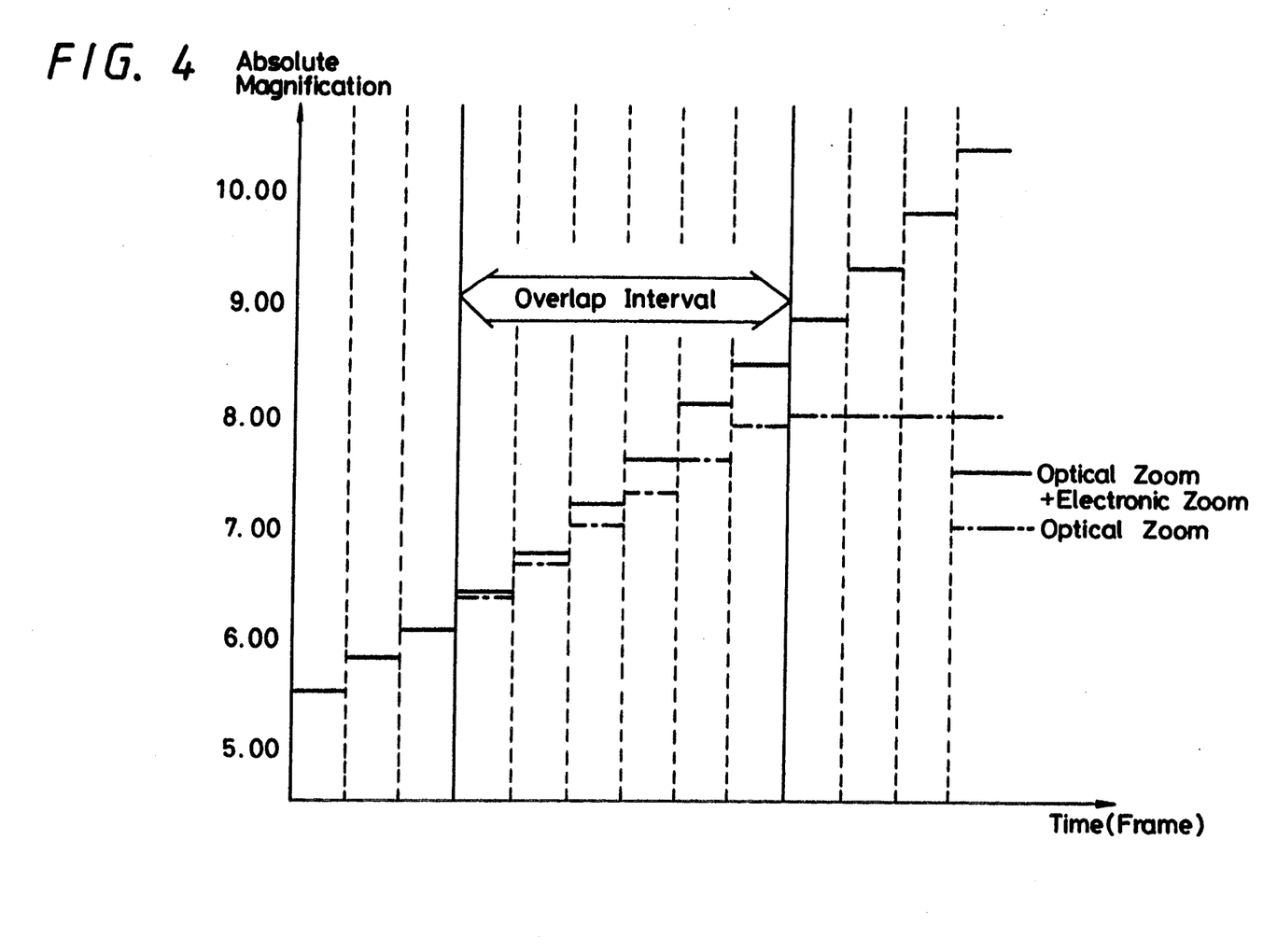
FIG. 4 is a schematic diagram showing the absolute change of a zoom magnification obtained when the optical zoom and the electronic zoom are effected in an overlapping fashion.

FIG. 4 is a diagram showing the condition that the ordinate in FIG. 3 is rewritten in the form of an absolute magnification. Since the optical zoom can provide a magnification of 8 times, the overlap interval occurs at the magnification of 8 times. A study of FIG. 4 reveals that the absolute magnification in which the optical zoom and the electronic zoom are added is increased substantially equally. That is, the change of the zoom speed shown in FIG. 3 does not affect the displacement of the absolute magnification substantially.

Conversely, when the electronic zoom is changed to the optical zoom, the microcomputer 8A determines and controls the optical zoom starting period from the zoom position of the electronic zoom.

By the above-mentioned operation of the present invention, the zoom speed between the optical zoom and the electronic zoom can be smoothly changed in a ganged relation to each other. Therefore, upon use, this apparatus is suitable for the user because the user cannot recognize the condition that the optical zoom is changed to the electronic zoom.

It is natural that a time period in which the zoom speed is decreased near the telephoto-lens end of the optical zoom when the variable speed zoom function is added to the video camera is changed with the zoom speed. As a result, inasmuch as the interval in which the optical zoom and the electronic zoom are operated in a ganged relation to each other is made constant according to the prior art, the optical zoom and the electronic zoom cannot be smoothly operated in a ganged relation with respect to respective zoom speeds.

More specifically, when the zoom speed is changed, it is frequently observed that there occur the cases that the above-mentioned interval in which the optical zoom and the electronic zoom are operated in a ganged relation to each other is proper or improper. As a result, the interlocking situation between the optical zoom and the electronic zoom becomes different, which is unnatural for the users of video camera.

To solve the aforesaid problem, in the above-mentioned video camera having the electronic zoom and the optical zoom, the smooth interlocking between both the optical zoom and the electronic zoom can be realized at any zoom speed by setting the interval in which the optical zoom and the electronic zoom are operated in a ganged relation to each other on the basis of the zooming speeds from a zoom speed standpoint.

More specifically, in the above-mentioned video camera, upon changing the optical zoom to the electronic zoom, when the zoom magnification to approaches the optical telephoto-lens end by the optical zoom means 1, the zoom speed of the electronic zoom is progressively increased so as to compensate for the zoom speed of the optical zoom that was decreased. At that time, the microcomputer 8B determines the zoom position of the optical zoom at which the electronic zoom is started at that zoom speed. In general, as the zoom speed is high, the interval in which the zoom speed of the optical zoom is decreased becomes long. Therefore, the interval in which the optical zoom and the electronic zoom are simultaneously effected is extended. Conversely, when the zoom speed is low, the above-mentioned interval in which the optical zoom and the electronic zoom are simultaneously effected is reduced.

Figure 5:
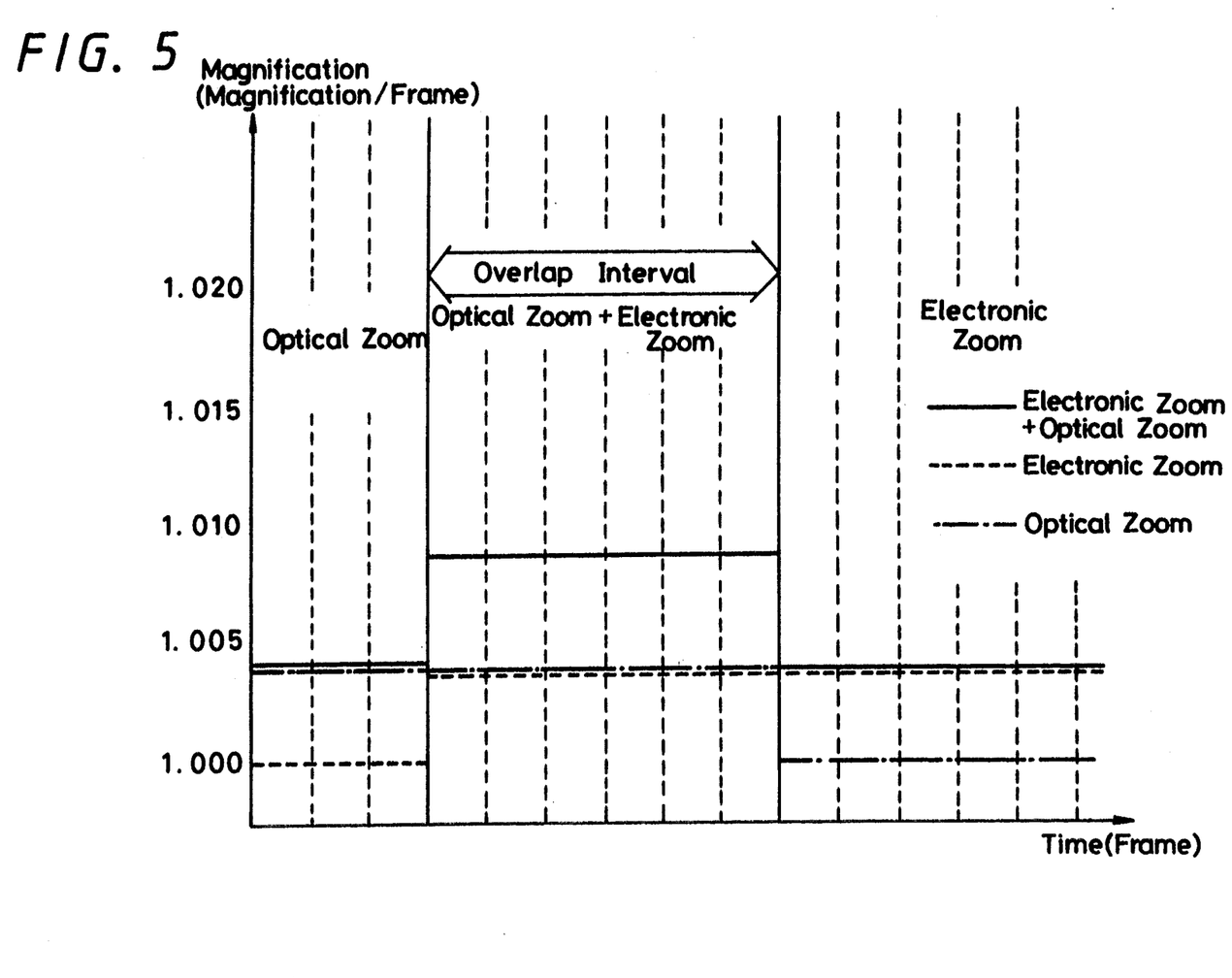
FIG. 5 is a schematic diagram showing the change of zoom speed obtained when the optical zoom and the electronic zoom are effected in the too long overlapping interval.
Figure 6:
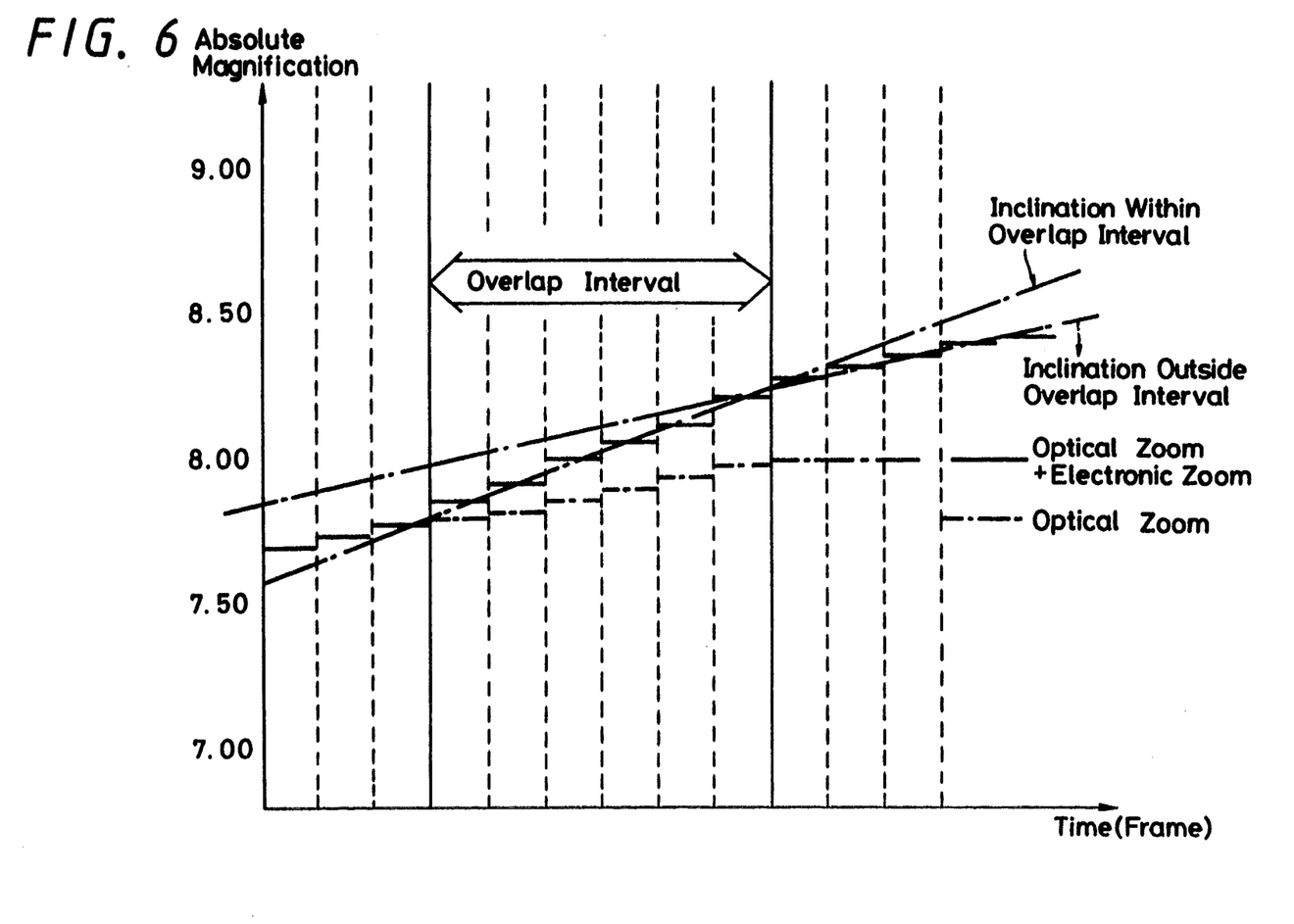
FIG. 6 is a diagram showing the absolute change of the zoom magnification obtained when the optical zoom and the electronic zoom are effected in the too long overlapping period.

FIG. 5 shows the change of the zoom speed observed when the zoom speed is decreased under the condition that the overlapping interval is set as shown in FIGS. 3 and 4. FIG. 6 shows the change of the zoom speed in which the ordinate in FIG. 5 represents the absolute magnification.

A study of FIG. 5 reveals that the synthesized speed (electronic zoom speed and the optical zoom speed)

within the overlapping interval is considerably increased for 6 frames continuously as compared with the zoom speed of the optical zoom. The reason for this is that the zoom speeds of the optical zoom and the electronic zoom are added together in an unnecessary interval of the deceleration interval or longer calculated when the zoom magnification reaches the optical telephoto-lens end because the overlapping interval is too long relative to the zoom speed. This shows that the optical zoom and the electronic zoom are not smoothly effected simultaneously. Therefore, the user can visually confirm the change of the zoom speed because the zoom speed that is considerably different as compared with the conventional speed is continued several frames.

A study of FIG. 6 reveals that the inclination of the change of the absolute magnification within the overlapping interval is large as compared with other intervals. From FIG. 6, it is clear that the zoom speed is changed. In other words, the reason that the change of the zoom speed is not so influential in FIGS. 3 and 4 is that the interval in which the zoom speed is considerably different as compared with the conventional speed is ended in a short period of time.

While the long overlapping interval is set relative to the actual zoom speed in FIGS. 5 and 6, if the short overlapping interval is set relative to the zoom speed, then the zooming operation seems to stop during the overlapping interval.

Figure 7:
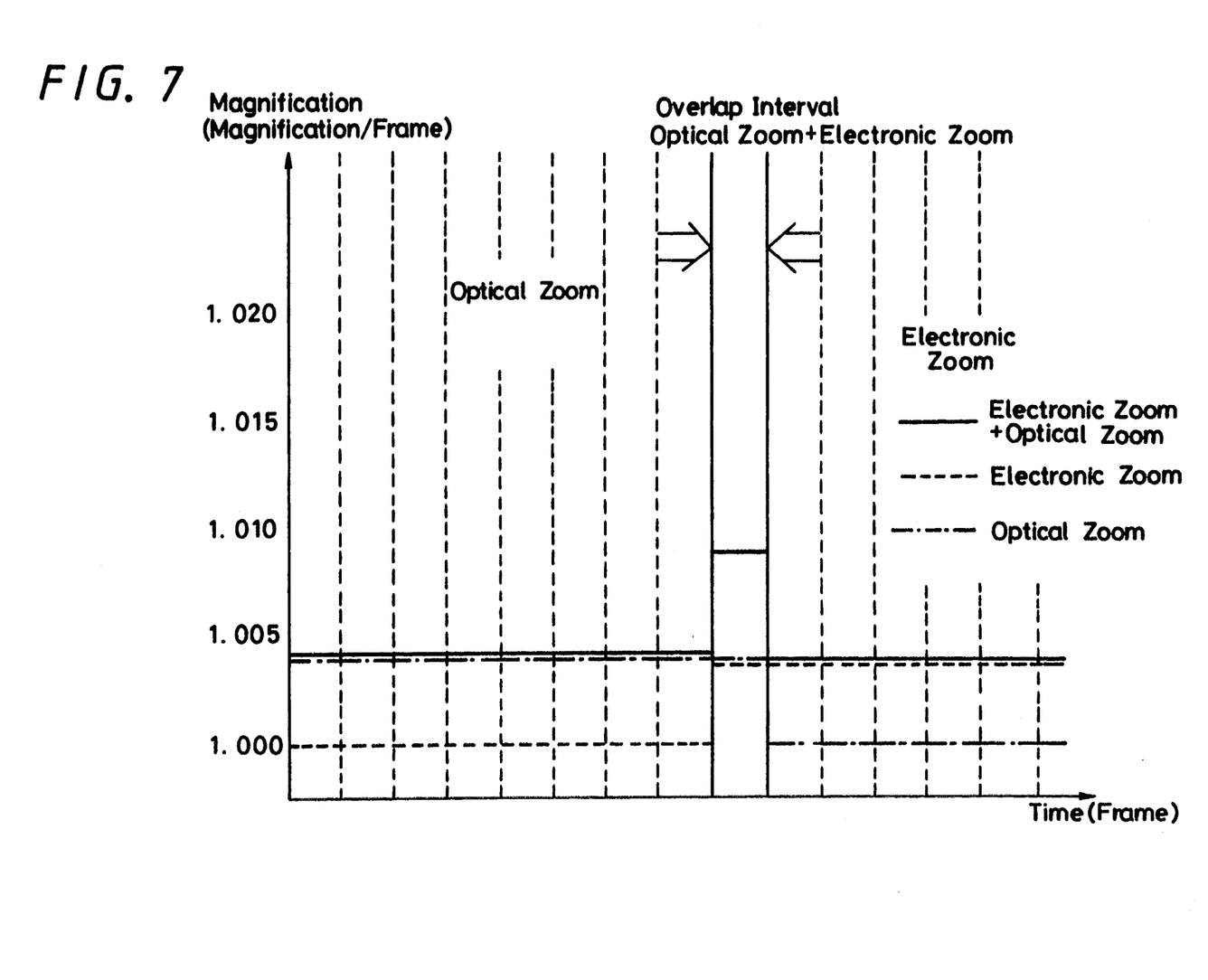
FIG. 7 is a schematic diagram showing the change of the zoom speed obtained when the optical zoom and the electronic zoom are effected in an overlapping state under the condition that a proper overlapping interval is set in the low speed zoom.
Figure 8:
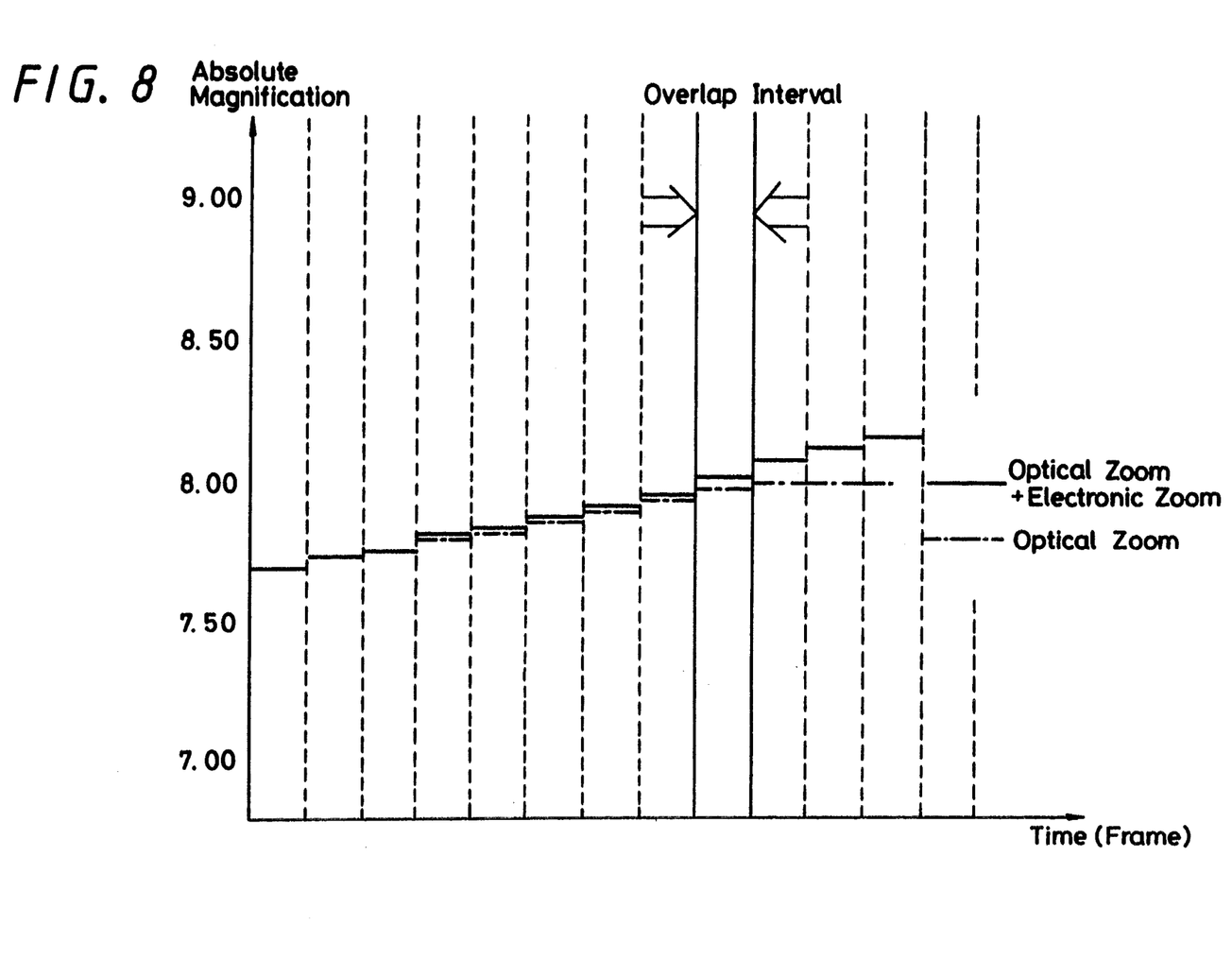
FIG. 8 is a schematic diagram showing the absolute change of a zoom magnification obtained when the optical zoom and the electronic zoom are effected in an overlapping fashion under the state that the proper overlapping interval is set upon low speed zooming.

FIGS. 7 and 8 show the change of the zoom speed observed when a proper overlapping interval is set at the zoom speeds shown in FIG. 5 and 6. A study of FIGS. 7 and 8 reveals that the optical zoom and the electronic zoom can be operated smoothly in a ganged relation from a zoom speed standpoint by setting the overlapping interval commensurable with the zoom speed even when the zooming is effected at the variable zoom speed. Conversely, when the electronic zoom is changed to the optical zoom, the microcomputer 8A determines and controls on the basis of the zoom position of the electronic zoom the optical zoom starting time for each zoom speed.

According to the aforesaid operation, the optical zoom and the electronic zoom can be smoothly operated in a ganged relation to each other at all zoom speeds from a zoom speed standpoint. Thus, the user need not become aware of the fact that the optical zoom is changed to the electronic zoom, which is convenient for the user when the video camera is in use.

When the zoom speed is suddenly decreased within the overlapping interval because the duration of the overlapping period becomes different in the zoom speed, there is then the possibility that the overlapping period will escape again from the overlapping interval after having entered the overlapping interval once. More specifically, a picture that once entered the overlapping period and was stored in the memory, i.e., a picture enlarged by the electronic zoom, is switched in a moment to a picture that was processed by the optical zoom. At that time, the picture seems to be affected by a camera shake.

Figure 9:
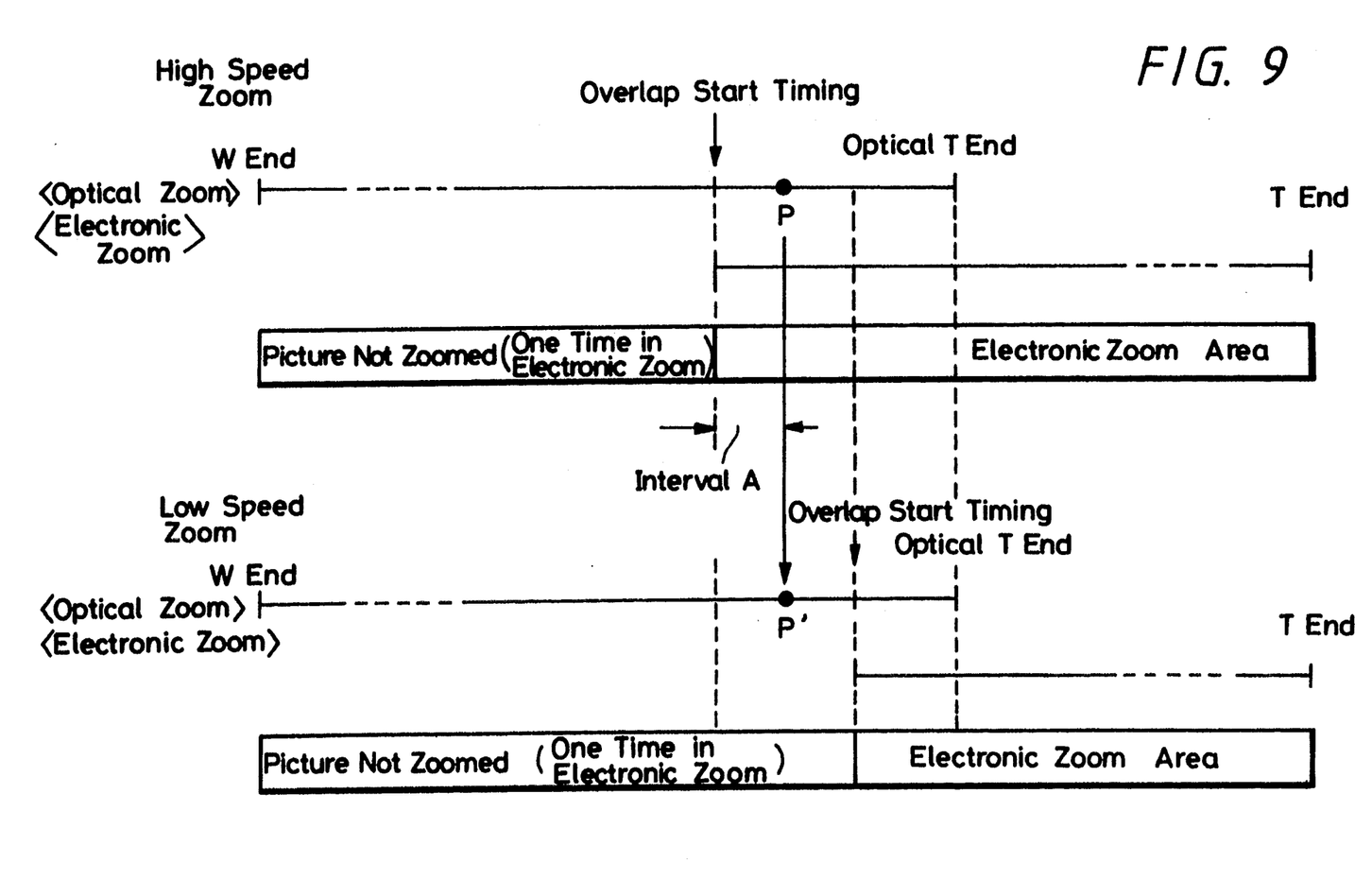
FIG. 9 is a diagram showing a case that an image vibration occurs when the optical zoom and the electronic zoom are effected in an overlapping fashion.

FIG. 9 is a schematic diagram used to explain why a camera shake occurs in the picture. An upper portion in FIG. 9 shows the condition that the zoom speed is high, and a lower portion in FIG. 9 shows the condition that the zoom speed is low. The term of high and low zoom speeds represents only the relative zoom speed. Also, as mentioned hereinbefore, the interval in which the optical zoom and the electronic zoom overlap each other (i.e., overlapping interval) when the zoom speed is low is reduced as compared with the overlapping interval used when the zoom speed is high.

As shown in FIG. 9, when the optical zoom is changed to the electronic zoom at a high zoom speed, the optical zoom passes the overlapping start timing position set at each zoom speed and then reaches a point P provided within the electronic zoom area. However, even in the same optical zoom position as the optical zoom position at which the zoom speed is rapidly decreased, the high speed zoom is changed to the low speed zoom, thereby the optical zoom is returned to the optical zoom position provided before the overlapping interval starts (see a point P' at the lower portion of FIG. 9).

At that time, the picture that was enlarged electronically by using the memory in the interval A of FIG. 9, is switched to the picture enlarged only by the optical zoom without the memory. More specifically, even though a telephoto-side zoom key is kept depressed, the magnification is changed to the wide angle lens direction in a moment, which appears as a camera shake.

Figure 10:
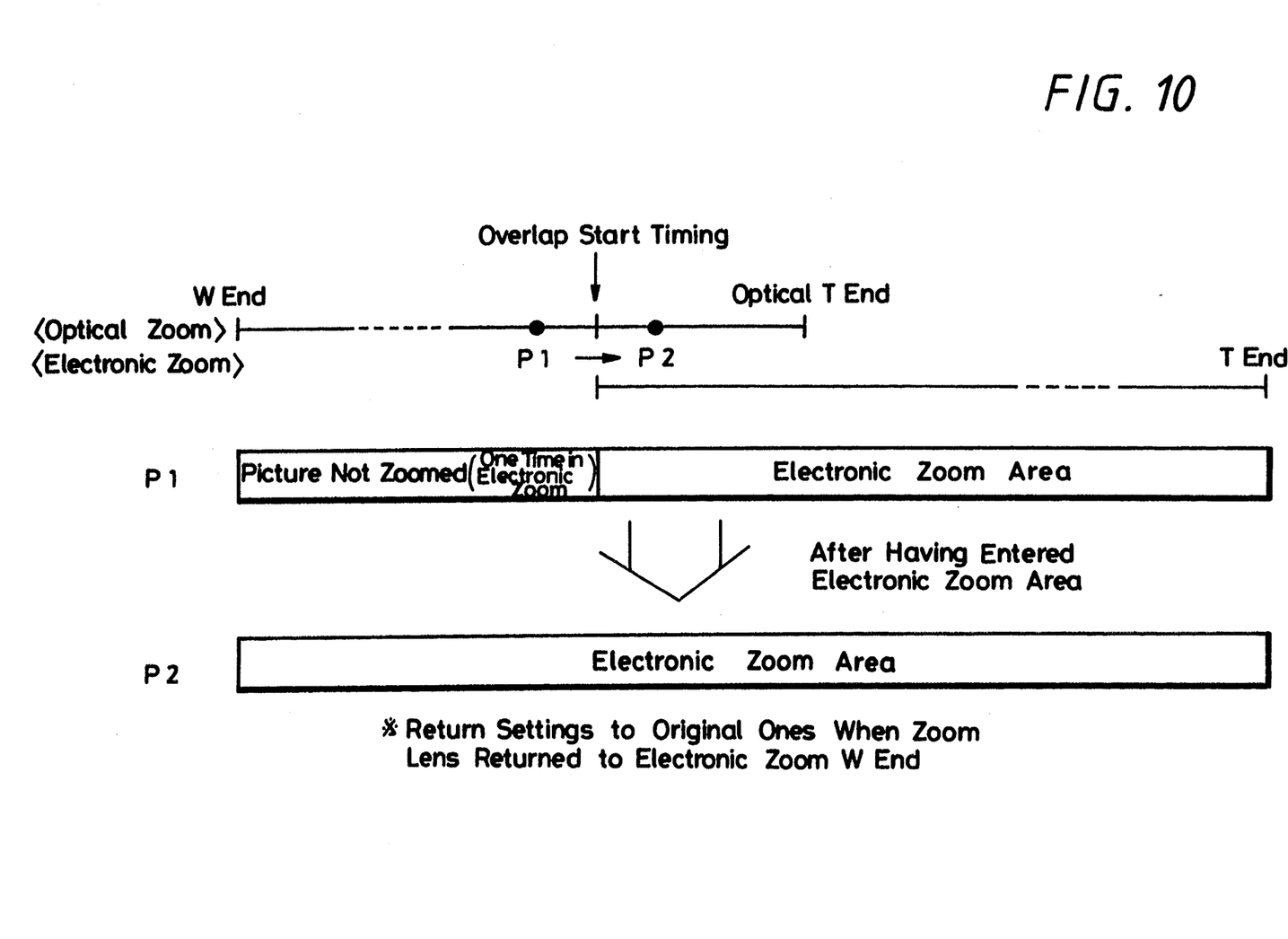
FIG. 10 is a diagram showing how to avoid image vibration when the optical zoom and the electronic zoom are effected in an overlapping fashion.

FIG. 10 is a schematic diagram showing a countermeasure for preventing the above-mentioned disadvantage.

Camera shake occurs because the zoom magnification is returned to the zoom magnification obtained before the start of the overlapping interval due to the change of the zoom speed regardless of the fact that the zoom magnification enters the electronic zoom area through the overlap start timing position. Specifically, it is possible to prevent a camera shake by inhibiting the zoom magnification from escaping the electronic zoom area if the zoom magnification entered this area once except if the zoom key is changed to the wide angle lens direction.

It is determined by the overlap start timing position set for each zoom speed whether or not the zoom magnification enters the electronic zoom area. Therefore, the zoom magnification can be kept within the electronic zoom area by changing the setting of the overlap start timing position. After the zoom position was moved from the point P1 to the point P2 in FIG. 10, it is sufficient that the setting of the optical zoom position that serves as the overlap start timing is largely shifted toward the wide angle lens direction (W end side in FIG. 10). The setting of the optical zoom position may be largely shifted toward the wide angle lens direction inasmuch as the zoom key is continuously depressed in the telephoto lens direction. When the zoom key is switched to the wide angle lens direction, the setting of the optical zoom position must be returned to the original one.

The zooming from the wide angle lens (W end side in FIG. 10) to the telephoto lens (T end side in FIG. 10) has been described so far. A zooming from the telephoto lens (T end side in FIG. 10) to the wide angle lens (W end side in FIG. 10) will be described below.

When the zooming from the telephoto lens side to the wide angle lens side is carried out, the electronic zoom position that determines the overlap start timing is set for each zoom speed similarly as described above. In this case, even if the zoom magnification is returned to that obtained before the overlap start timing when the zoom speed is rapidly decreased within the overlap interval, such area still remains as the electronic zoom area. Therefore, the zoom magnification never returns to the original one to cause the camera shake. Specifically, when the zooming from the telephoto lens direction to the wide angle lens direction is carried out, even if the zoom speed is changed rapidly, the occurrence of camera shake can be avoided.

By the above-mentioned action, the optical zoom and the electronic zoom can be smoothly carried out at any zoom speeds regardless of any change of the zoom speed. Therefore, the user need not become aware of the fact that the optical zoom is changed to the electronic zoom, which is convenient for the user in actual practice.

As described above, according to the present invention, the zoom speed of the video camera having the electronic zoom can be varied by changing the reading style of the zoom magnification data (base table) in response to the zoom speed.

Further, according to the present invention, in the video camera having the optical zoom and the electronic zoom, the optical zoom and the electronic zoom can both be smoothly operated in a ganged relation from a zoom speed standpoint by setting the intervals in which the above two zooms overlap each other for each zoom speed. Accordingly, a user's sense of incompatibility can be reduced.

Furthermore, according to the present invention, in the video camera having the optical zoom and the electronic zoom, the optical zoom and the electronic zoom can be smoothly carried out from a zoom speed standpoint by setting intervals in which the above optical zoom and the electronic zoom are effected in an overlapping fashion for each zoom speed and by shifting the overlap start timing so as to cope with the change of the zoom speed. Thus, the user's sense of incompatibility can be reduced.

In addition, since the zoom speed is substantially constant, the user need not become aware of the fact that the optical zoom is changed to the electronic zoom and vice versa.

A second embodiment of the present invention will be described below with reference to FIG. 11 and FIGS. 12A to 12C.

Figure 11:
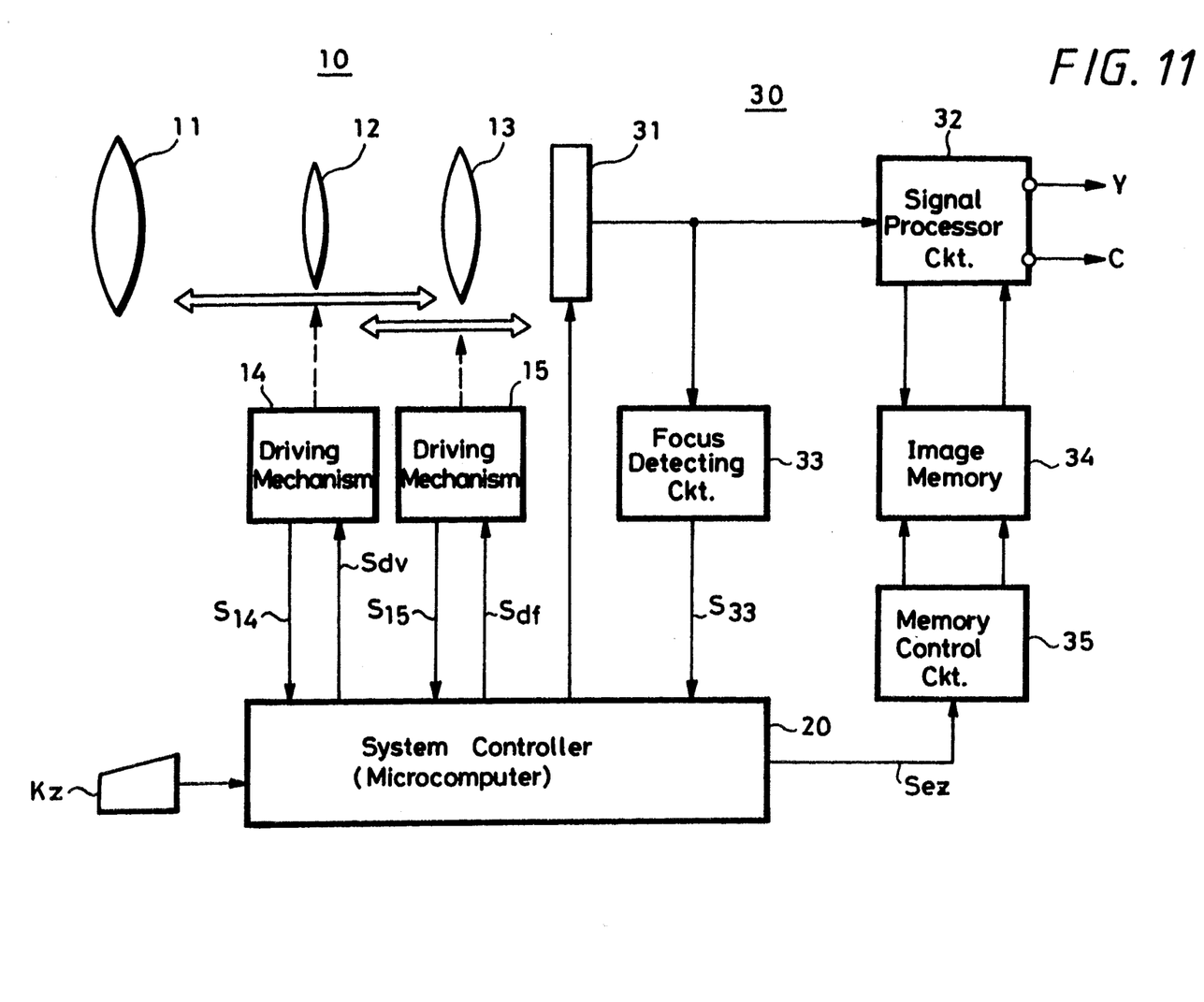
FIG. 11 is a schematic block diagram showing a circuit arrangement of a video camera apparatus according to a second embodiment of the present invention.

FIG. 11 is a schematic diagram showing a second embodiment of a video camera apparatus according to the present invention. As shown in FIG. 11, there is provided an inner-focusing type zoom lens 10 which is comprised of a fixed front lens 11, a movable variable power lens 12 and a focusing lens 13. The variable power lens 12 and the focusing lens 13 are moved by driving mechanisms 14, 15 including, for example, stepping motors (not shown) in predetermined ranges in the optical axis directions, respectively.

There is shown a system controller circuit 20 (i.e., microcomputer) which includes a zoom operation key Kz connected thereto. Position information S14, S15 of the corresponding variable power lens 12 and focusing lens 13 are supplied from the respective driving mechanisms 14, 15 to the microcomputer 20, and signals sdv, sdf that are used to drive the lenses 12, 13 are supplied to the driving mechanisms 14, 15 from the microcomputer 20.

There is shown an imaging circuit 30 in which an output signal from a solid state imaging device 31, such as a CCD (charge-coupled device), is supplied to an image signal processor circuit 32 which derives a luminance signal Y and a color signal C.

An output signal from the solid state imaging device 31 is supplied to a focus detecting circuit 33 which generates auto focus focusing information (error information) S33. The focusing information S33 is supplied to the microcomputer 20.

Further, in the second embodiment of the present invention, there is provided a video memory 34 formed of a frame memory, for example. Writing to and reading from the memory 34 are controlled by a memory control circuit 35, and the memory control circuit 35 is operated under the control of the microcomputer 20.

A zooming operation of the second embodiment of the present invention will be described below.

When the cameraman takes a picture, the microcomputer 20 generates and supplies the lens drive signal Sdf to the lens driving mechanism 15 on the basis of the focusing information S33 from the focusing detection circuit 33 to cause the focusing lens 13 to be automatically focused.

When the key Kz is operated, the microcomputer 20 supplies the lens drive signal Sdv to the lens driving mechanism 14 to drive the variable power lens 12, whereby the zoom magnification of the zoom lens 10 is increased from one time of the maximum wide angle lens state to n times of the maximum telephoto-lens state at a variable power speed, such as twice per unit time, in response to a time required when the key Kz is operated.

In this way, under the condition that the zoom lens 10 is focused, a distance from the zoom lens 10 to the object is uniquely determined depending on the positions of the variable power lens 12 and the focusing lens 13.

The microcomputer 20 calculates a distance Dob to the object and a shortest shooting distance Dzj corresponding to a present zoom magnification j ($1 \geq j \geq n$) of the zoom lens 10 at every field (1/60 second) of, for example, a video signal on the basis of the position informations S14 and S15 of the variable power lens 12 and the focusing lens 13 supplied thereto from the lens drive mechanisms 14, 15 to thereby determine which one of the distance Dob and the distance Dzj is larger.

When the distance Dob up to the object is larger than the present shortest shooting distance Dzj, the object is located outside of the defocusing area of the zoom lens 10 and the properly-focused state is presented. Therefore, the optical zooming can be effected by the zoom lens 10.

When the distance Dob up to the object is shorter than the shortest shooting distance Dzj as in the present case, the object is located within the de-focusing area of the zoom lens 10 and the properly-focused state cannot be obtained.

Accordingly, in this embodiment, an electronic zooming which will be described below is carried out within the defocusing area.

Figure 12A:
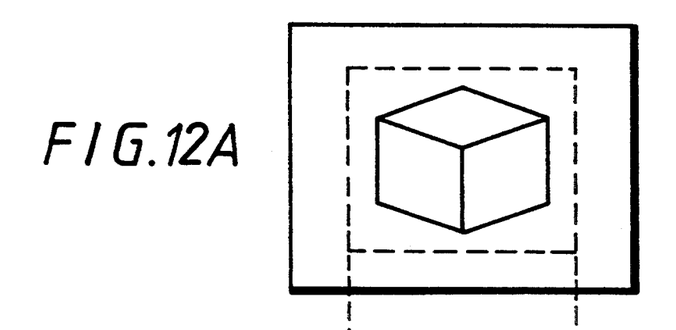
FIGS. 12A through 12C are respectively schematic diagrams used to explain a zooming operation of the second embodiment of the video camera apparatus according to the present invention.
Figure 12B:
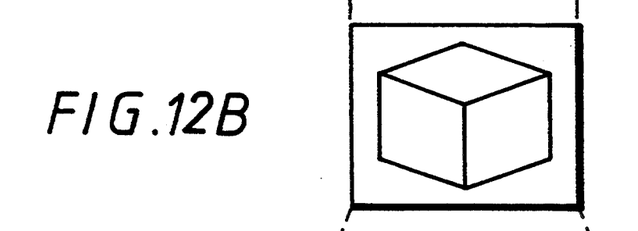
Figure 12C:
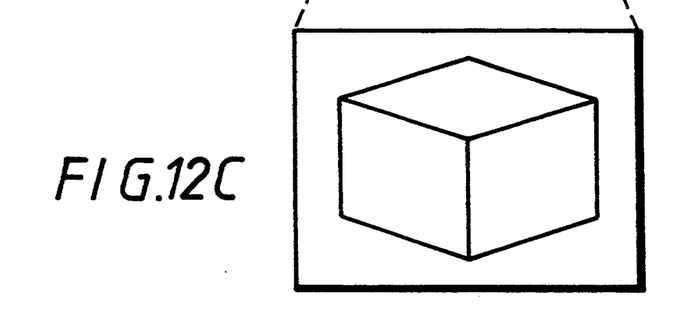

A picture corresponding to a picture frame corresponding to the zoom magnification is obtained by decimating pixels from image data stored in the video memory 34 which presents a picture (FIG. 12A) in the properly-focused state under the condition that the object is located out of the de-focusing area, as shown in FIG. 12B. Also, an enlarged picture corresponding to the zoom magnification as shown in FIG. 12C is obtained by interpolating the pixels of the picture having that picture frame. If the pixels are interpolated in a pre-interpolation fashion, then the pixels can be interpolated by reading the same pixels a plurality of times when the pixel data is read out from the video memory 34. If on the other hand the pixels are interpolated in a mean value interpolation fashion, then the pixels can be interpolated by a signal processor circuit.

A properly-focused picture can be constantly obtained by carrying out this electronic zooming.

Having described preferred embodiments of the invention with reference to the accompanying drawings, it is to be understood that the invention is not limited to those precise embodiments and that various changes and modifications could be effected therein by one skilled in the art without departing from the spirit or scope of the novel concepts of the invention as defined in the appended claims.

What is claimed is:

1. A video camera comprising:
a lens group for converging a light from an object and having a settable magnification;
an imaging device for converting the light converged by said lens group into an electrical signal;
a signal processor circuit for converting the electrical signal from said imaging device into a video signal;
a memory circuit for storing therein a plurality of video signals output from said signal processor circuit;
electronic zoom means for controlling reading of said plurality of video signals stored in said memory circuit;
control means for controlling said electronic zoom means; and
a memory table contained in said control means, wherein said control means determines based on magnification data stored in said memory table and a set magnification of said lens group a sequential order in which said plurality of video signals are read out from said memory circuit, and wherein a magnification of said electronic zoom means is changed slowly by sequentially reading said plurality of video signals in said sequential order determined by said control means and a speed of varying said magnification is increased by arbitrarily skipping selected signals of said plurality of video signals when reading said plurality of signals from said memory circuit.

2. A video camera according to claim 1, wherein said lens group comprises optical zoom means, and a zooming operation of said video camera includes optical zooming, electronic zooming, and an overlapping interval between said optical zooming and said electronic zooming in which said optical zoom means and said electronic zoom means are smoothly operated in a ganged relation.

3. A video camera according to claim 2, wherein said electronic zoom means performs a variable speed zoom at a plurality of zoom speeds and wherein a length of said overlapping interval corresponds to a selected one of said plurality of zoom speeds of said variable speed zoom.

4. A video camera according to claim 3, wherein a start timing of said overlapping interval is shifted in response to a corresponding zoom speed of said electronic zoom means to thereby prevent an image vibration.

5. A zoom apparatus for a video camera comprising:
a lens group for converging a light from an object and having a settable magnification;
an imaging device for converting the light converged by said lens group into an electrical signal;
a signal processor circuit for converting the electrical signal from said imaging device into a video signal;
a memory circuit for storing therein a plurality of video signals output from said signal processor circuit;
electronic zoom means for controlling reading of said plurality of video signals stored in said memory circuit;
control means for controlling said electronic zoom means; and
a memory table contained in said control means, wherein said control means determines based on magnification data stored in said memory table and a set magnification of said lens group a sequential order in which said plurality of video signals are read out from said memory circuit, wherein a magnification of said electronic zoom means is changed slowly by sequentially reading said plurality of video signals in said sequential order determined by said control means and a speed of varying said magnification is increased by arbitrarily skipping selected signals of said plurality of video signals when reading said plurality of video signals from said memory circuit.

6. A zoom apparatus for a video camera according to claim 5, wherein said electronic zoom means performs a variable speed zoom at a plurality of zoom speeds, wherein said lens group comprises optical zoom means, and wherein a zooming operation of said video camera includes optical zooming, electronic zooming, and an overlapping interval between said optical zooming and said electronic zooming in which said optical zoom means and said electronic zoom means are smoothly operated in a ganged relation.

7. A zoom apparatus for a video camera according to claim 6, wherein a length of said overlapping interval corresponds to a selected one of said plurality of zoom speeds of said electronic zoom means so that said electronic zoom means and said optical zoom means can be smoothly operated in a ganged relation.

8. A zoom apparatus for a video camera according to claim 7, wherein a start timing of said overlapping interval is shifted for each corresponding zoom speed of said electronic zoom means to thereby prevent an image vibration.

* * * * *